Figure 1:
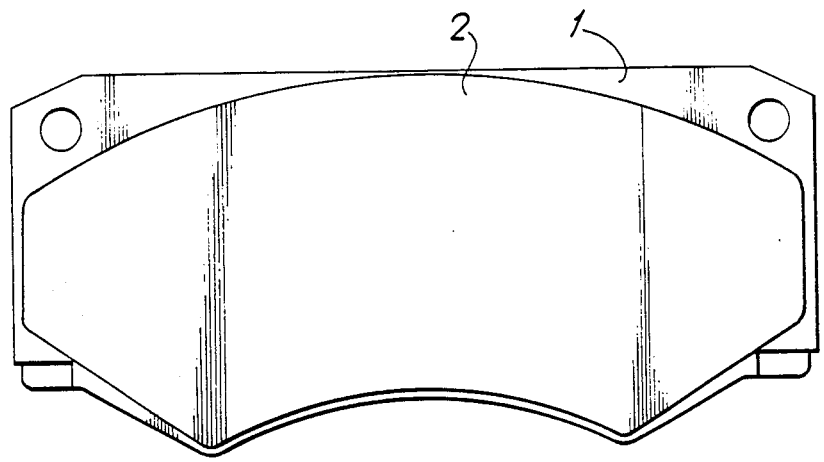

United States Patent [19]

Sweetmore et al.

[11] Patent Number: 4,846,312
[45] Date of Patent: Jul. 11, 1989

[54] DISC BRAKE PADS

[75] Inventors: Roy Sweetmore, Buxton; Roy A. Eastham, Hadfield, both of United Kingdom

[73] Assignee: Ferodo Ltd., Manchester, United Kingdom

[21] Appl. No.: 165,468

[22] Filed: Mar. 8, 1988

[30] Foreign Application Priority Data

Mar. 19, 1987 [GB] United Kingdom ................. 8705659

[51] Int. Cl.[4] .............................................. F16D 65/02
[52] U.S. Cl. ................................ 188/73.1; 188/73.37; 188/250 G
[58] Field of Search ................. 188/73.1, 73.35, 73.36, 188/73.37, 250 B, 250 E, 250 G

[56] References Cited

U.S. PATENT DOCUMENTS

| 3,490,563 | 1/1970 | Hahm | 188/73.37 |
| 3,563,347 | 2/1971 | Hahm | 188/73.1 |
| 3,918,555 | 11/1975 | Rath | 188/73.37 |

FOREIGN PATENT DOCUMENTS

| 0054873 | 5/1977 | Japan | 188/250 E |
| 0207535 | 12/1983 | Japan | 188/73.37 |
| 1524827 | 9/1978 | United Kingdom | 188/73.1 |

Primary Examiner—Duane A. Reger
Attorney, Agent, or Firm—Nixon & Vanderhye

[57] ABSTRACT

A disc brake pad and shim assembly consists of a disc brake pad having a back plate with spigot holes which are incompletely filled and a shim with protrusions extending into the unfilled regions of the spigot holes, to stop slippage of the shim across the back plate in service.

6 Claims, 2 Drawing Sheets

DISC BRAKE PADS

This invention relates to disc brake pads, and particularly to disc brake pads which are to be assembled with a shim.

In modern car and commercial vehicle disc brake installations there is an increasing use of noise attenuating and/or thermal barrier shims as a part of a composite disc brake pad and shim assembly. The shims used can be of coated metal or of fibre reinforced plastics materials and are often attached to the back of the pad by means of adhesive, eg a contact adhesive or a thermoset adhesive.

Both of these types of adhesive are liable to fail under very heavy duty use where the brake pad can reach extremely high temperatures, whereupon the shim is liable to slip relative to the pad and in some cases has been known to fall out of the caliper, or cause damage.

In UK Patent Specifications Nos. 2 127 918 and 2 129 511 we propose methods of alleviating these problems using shim pads which are held in position by means of metal clips which either clip onto a back-plate of a disc brake pad, or on to a brake piston. These methods, whilst serving the purpose intended do require use of a separate metal clip, which is an extra component to be manufactured and assembled.

In UK published Patent Application No. 2 020 763A there is described a disc brake pad which has a multi-part carrier plate (or back plate as we would call it) which is of a sandwich construction having two plates separated by a not very compressible, thin, vibration damping and heat-insulating resilient connecting layer (eg rubber modified asbestos) which also serves to bond the two plates together. The two plates are provided with corresponding interengaging centring depressions and centring projections having oblique centring faces, the projections in the one plate engaging with the depressions in the other. In this construction, however, the usual thick back plate is replaced by the sandwich constructed carrier plate and the construction is expensive whilst the fact that there is still a substantial plate in contact with the brake piston means that the construction is not wholly effective in damping out noise.

We have now found that the problem of slippage of shims may be solved by a method which requires no extra components in the assembly, and utilizes a conventional brake pad back plate.

According to the present invention there is provided a disc brake pad and shim assembly in which the disc brake pad comprises a back plate having at least two spigot holes, and a pad of friction material on one surface of the back plate, said friction material extending into but not completely filling said spigot holes, the shim being positioned on the other surface of the back plate and being provided with protrusions which extend into the unfilled region of said spigot holes in the back plate to provide a means to resist slippage of the shim across the back plate.

The back plate of the disc brake pad will normally be a metal plate and spigot holes are conventionally provided in the back plate, friction material being forced into them during the moulding of the pad of friction material on the surface of the plate.

The purpose of this is to increase the adhesion of the pad to the back plate and assist in providing adequate resistance to shearing of the pad from the plate during heavy braking.

Usually the spigot holes are filled with friction material but in the present invention care is taken to ensure that the spigot hole is incompletely filled. This may be done, for example, by blanking off the end of the spigot hole remote from the pad of friction material when the latter is being moulded onto the back plate. Preferably not more than 30 per cent of the depth of the spigot hole is left unfilled in each case, leaving for example a depth of unfilled spigot hole of 1 mm to 2 mm which is readily usable for the purposes of this invention.

The friction material may be any of the well-known types of compositions used for disc brake pads. These are usually composed of fibres, fillers, thermoset polymeric binder and various additives used as friction and wear modifiers.

The number of spigot holes provided in the back plate is not critical provided that at least two incompletely filled holes are provided to enable resistance against relative rotation of the shim and back plate to be obtained.

The shim may be made from the usual types of materials used and may be bonded to the back plate by means of a contact or thermoset adhesive in the usual manner, and the protrusions on the shim may be provided before or after the shim has been applied to the back plate.

Preferred shim materials are those which are sufficiently deformable to enable the projection into the unfilled part of the spigot hole to be formed by deformation of a flat shim. In this case the shim material may be manufactured as a flat sheet from which individual shims can be cut. Using such materials it is also possible to form the projections on the shim by deformation of the shim material into the incompletely filled spigot holes with the shim in situ on the surface of the back plate.

The particularly preferred shim materials incorporate a sheet or mesh of a metal such as steel, plated or unplated. Thus a metal sheet coated with rubber or a fibre reinforced composite sheet laminated with a metal sheet or mesh is a particularly suitable shim material. Where the shim contains a metal sheet or mesh the thickness of the metal will normally be in the range 0.15 mm to 0.50 mm.

When such a shim has been assembled against a back plate a positive mechanical location against sideways slippage is readily provided by pressing the shim into the spigot holes by means of a suitable forming tool. It is to be noted that if the back plate is provided with several spigot holes it may not be necessry to have protrusions from the shim into more than two of them, and in this event it is also possible to completely fill some of the spigot holes with friction material if desired.

Figure 4:
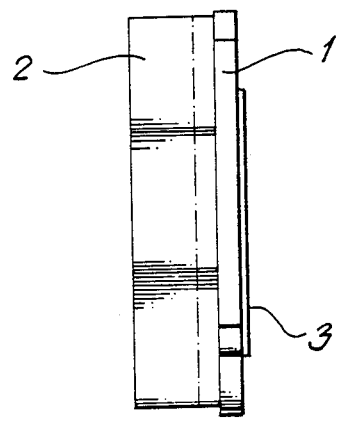
Figure 2:
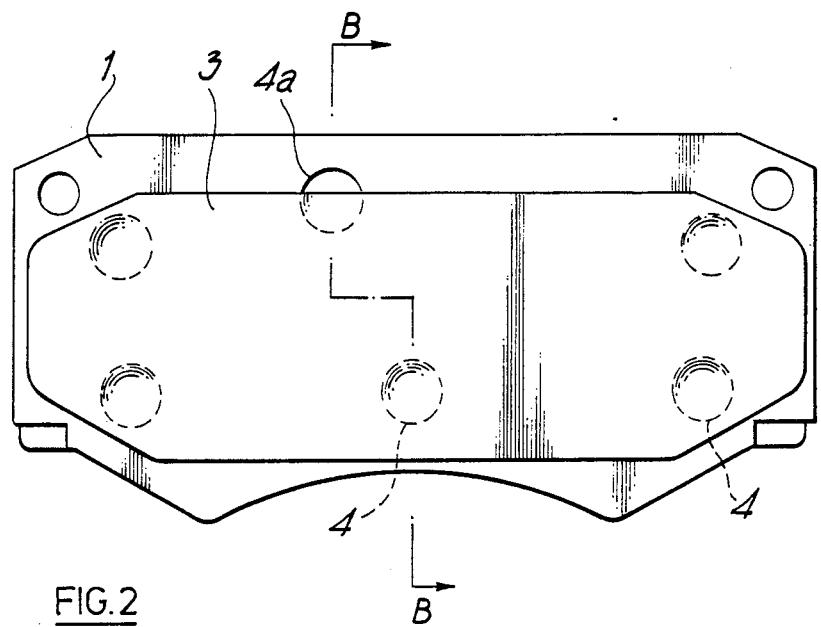
Figure 3:
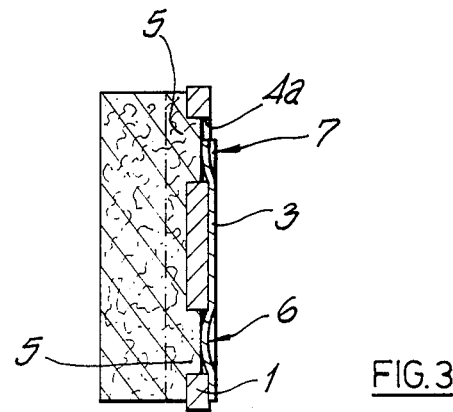

The invention will now be specifically described, by way of example only, with reference to the accompanying drawings in which FIG. 1 is a view of a disc brake pad from the side carrying a pad of friction material FIG. 2 is a view of the pad of FIG. 1 from the opposite side FIG. 3 is a section on the line B—B in FIG. 2 and FIG. 4 is an end view of the assembly of shim and disc brake pad.

As shown in FIG. 1 the disc brake pad includes a back plate 1, which is of steel, and a pad of friction material 2.

The back plate 1 has six spigot holes 4 in it, the locations of these being shown in FIG. 2 in broken lines. On the opposite side of the back plate 1 from the pad of friction material 2 a shim 3 is adhered to the back plate by means of a suitable adhesive of known type, e.g. thermoset.

The relative thicknesses of the shim 3, which may, for example, be of rubber coated steel sheet, the back plate 1, which is of thicker steel, and the pad of friction material 2 are best illustrated in FIG. 4. In a typical pad these thicknesses are for example pad (2) 12 mm, back plate (1) 5 mm and shim (3) 0.80 mm, the shim being of spring steel coated with a nitrile rubber based composition, the thickness of the spring steel being 0.35 mm.

As shown in FIG. 3, the spigot holes 4 are incompletely filled with friction material 5 so that the shim 3 can be deformed into the empty part of the spigot hole to form a protrusion 6 which will resist slippage of the shim on the back plate. In the case of the spigot hole 4a (FIG. 3) the shim 3 does not completely cover the spigot hole but here the shim edge can be deformed into the empty part of the spigot hole to form a protrusion 7.

In the example illustrated in these drawings it is to be noted that since the spigot holes are widely spaced, each one is incompletely filled, and the shim is deformed into the space left in each, to ensure excellent resistance to slippage.

We claim:

1. A disc brake pad and shim assembly in which the disc brake pad comprises a back plate having at lease two spigot holes, and a pad of friction material on one surface of the back plate, said friction material extending into but not completely filling said spigot holes such that not more than 30% of the depth of the spigot hole is left unfilled in each incompletely filled spigot hole, the shim being positioned on the other surface of the back plate and being provided with protrusions which extend into the unfilled regions of said spigot holes in the back plate to provide a means to resist slippage of the shim across the back plate, and wherein the shim is bonded to the back plate by means of an adhesive.

2. A disc brake pad and shim assembly according to claim 1 in which the back plate of the disc brake pad is a metal plate.

3. A disc brake pad and shim assembly according to claim 1 or 2 in which the shim material incorporates a sheet or mesh of a metal.

4. A disc brake pad and shim assembly according to claim 3 in which the thickness of the metal sheet or mesh is in the range 0.15 mm to 0.50 mm.

5. An assembly according to claim 3 in which the shim material is a metal sheet coated with rubber.

6. An assembly according to claim 3 in which the shim material is a fibre reinforced composite sheet laminated with a metal sheet or mesh.

* * * * *